INVENTOR
C. K. N. PATEL
BY *Wilford L. Wisner*
ATTORNEY

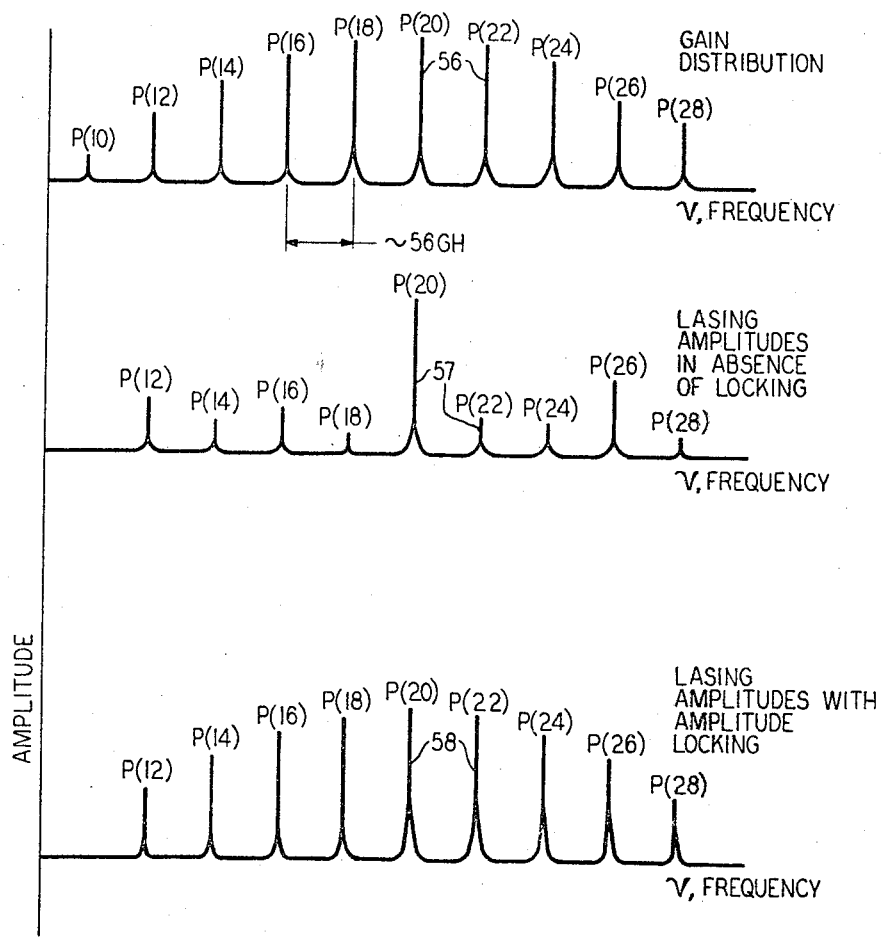

3,493,894
AMPLITUDE AND PHASE-LOCKING OF LASER TRANSITIONS BY SELF-DRIVEN PARAMETRIC INTERACTION
Chandra K. N. Patel, Chatham, N.J., assignor to Bell Telephone Laboratories, Incorporated, Murray Hill and Berkeley Heights, N.J., a corporation of New York
Filed Aug. 21, 1967, Ser. No. 662,152
Int. Cl. H01s 3/22
U.S. Cl. 331—94.5        5 Claims

ABSTRACT OF THE DISCLOSURE

Multiple lasing transitions in a molecular laser, such as the 10.6 micron carbon dioxide laser, are amplitude and phase-locked by a parametric interaction driven entirely by those transitions without an external signal at the frequency spacing of the transitions.

The parametric interaction is provided by a plasma device, such as a crystal of $n$-type indium arsenide having a concentration of mobile charge carriers of about $1 \times 10^{17}$ charge carriers per cubic centimeter, that is disposed within the optical resonator.

Both continuous-wave and Q-switched lasers may employ this technique because of its rapid response characteristics.

BACKGROUND OF THE INVENTION

This invention relates to amplitude and phase-locking of multiple lasing transitions in a laser.

Every laser includes an active medium that has at least one pair of energy levels between which a radiative transition can be stimulated in order to emit coherent radiation. Broadly, coherent radiation is radiation all portions of which are in phase. Ideally, it is monochromatic; that is, it has only a single frequency.

Nevertheless, several effects tend to decrease the degree of coherence of the radiation and to provide more than a single output frequency. First, random thermal motion of the particles in the active medium produces what is called Doppler-broadening. There is produced a band of frequencies centered about the theoretically-expected frequency, or natural line center. Second, the reflectors that form the laser resonator are spaced many wavelengths apart and have lateral extents of many wavelengths, so that they support many different longitudinal and transverse modes. The longitudinal modes have different frequencies that are regularly spaced within the Doppler-broadened line width. Third, many lasers include active media having many different pairs of energy levels capable of supporting simultaneous lasing transitions. A good example of this type of laser is the high-power carbon dioxide laser operating near 10.6 microns. It produces, simultaneously, lasing action upon several transitions between different pairs of rotational energy levels in different vibrational energy levels. The rotational and vibrational energy levels represent components of the kinetic energy of the complete carbon dioxide molecule in various states of excitation.

It has been shown that the presence of many modes in a laser, all of which typically are within the band of frequencies, or line width, of a single transition, can be employed to produce an orderly series of output pulses by modulating the loss of the laser resonator at a frequency which is equal to the frequency spacing of the modes. The orderly series of pulses is usually more useful for communication and some other purposes than are the randomly-phased modes that may exist in the absence of the loss modulation.

It has been shown in many ways that a reactive, or non-lossy, modulation can produce an orderly series of pulses from a multi-mode laser under suitable conditions. One type of such scheme, called the f-m laser, can even produce a monochromatic output with appropriate auxiliary apparatus.

All of the foregoing modulation schemes require that a modulating signal be supplied from outside the laser resonator and that substantial power be consumed in the modulation process. Moreover, the modulating frequency must be carefully selected and adjusted.

Another problem found in the prior art techniques is that they do not typically provide amplitude and phase-locking of multiple transitions of a Q-switched laser such as a Q-switched carbon dioxide laser because of the time required for the modulating interaction to build up as compared to the width of a Q-switched pulse. Yet 10.6 micron pulse trains from a Q-switched carbon dioxide laser with a large number of pulses during each Q-switching cycle would be very useful for atmospheric communication. Not only is the 10.6 micron wavelength within an "atmospheric window," in that the atmosphere provides relatively small attenuation; but also the use of pulses with a high repetition rate would help to utilize the available bandwidth as fully as possible while making it possible to eliminate many disturbances and noise by pulse regeneration at appropriate repeaters.

SUMMARY OF THE INVENTION

In accordance with my invention, multiple lasing transitions in a laser are amplitude and phase-locked by a parametric interaction driven entirely by the radiations of the transitions without an external signal at the frequency spacing of the transitions.

According to a feature of the invention, in a molecular laser having many rotational energy transitions, the parametric interaction is produced in a body of semiconductive material having a nonparabolic conduction band via a plasma of mobile charge carriers in the conduction band. The word plasma is used here in the sense of a substantial concentration of the mobile charge carriers.

It is one advantage of the present invention that the locking can be achieved not only in a continuous-wave molecular laser, but also in a Q-switched molecular laser, even one operated so rapidly that there would not normally be any locking producible by an external modulating signal.

BRIEF DESCRIPTION OF THE DRAWING

Further features and advantages of my present invention may be apprehended from the following detailed description, taken together with the drawing, in which:

FIG. 3 shows curves that are useful in understanding the theory and operation of the invention.

DESCRIPTION OF ILLUSTRATIVE EMBODIMENTS

Figure 1:
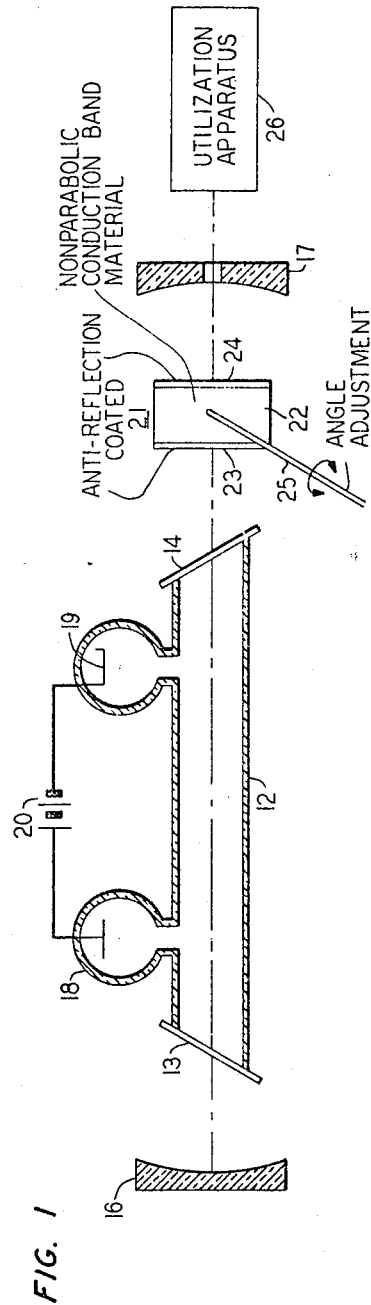
FIG. 1 is a partially pictorial and partially block diagrammatic illustration of a first embodiment of the invention.

In the illustrative embodiment of FIG. 1, a continuous-wave molecular laser, such as the high-power carbon dioxide laser operating at 10.6 microns, is amplitude-locked and phase-locked according to my present invention. Without amplitude-locking, the relative amplitudes of the coherent light emissions of the different lasing transitions would tend to fluctuate randomly as the result of certain weak competition effects among them and other disturbances. With amplitude-locking, the relative amplitudes will remain constant. Likewise, without phase-locking, the relative phases of the coherent light emissions of the different lasing transitions will tend to fluctuate randomly. With phase-locking, the phase relationships become orderly and predictable. Hence, they are said to be "locked". Amplitude-locking and phase-locking are usually obtained together. Thus, hereafter, the desired result will be designated amplitude and phase-locking.

The continuous-wave carbon dioxide laser of FIG. 1 includes a tube 12 containing an active medium comprising a gaseous mixture of carbon dioxide and helium in proportions of about 1:10, respectively. Although a static mixture is indicated, a flowing gas mixture may be desirable in some applications. The flowing gas mixture would advantageously include a substantial quantity of nitrogen in the mixture. The tube 12 has Brewster-angle end windows 13 and 14 and pumping means including a direct-current source 20, an anode 18 connected to the positive terminal of source 20 and a cathode 19 connected to the negative terminal of source 20. Anode 18 and cathode 19 are disposed within tube 12 and offset from its axis. The laser includes an optical resonator formed by focusing reflectors 16 and 17, which are opposed along the axis of tube 12. Reflectors 16 and 17 are illustratively gold-coated for maximum reflectivity at 10.6 microns; and reflector 17 is provided with a central aperture through which a portion of the coherent light is extracted. The coherent light extracted from the laser is received and utilized by utilization apparatus 26, for example, an optical modulator or a high-power parametric frequency converter, either of which would be a typical component of an optical communication system.

In order to achieve the desired amplitude and phase-locking of the output radiation, the laser includes the plasma device 21, comprising the body 22 of semiconductive material having a nonparabolic conduction band and antireflection coatings 23 and 24 on the major surfaces thereof, which are oriented to transmit the 10.6 micron coherent radiation. An axle 25 is attached to a lateral surface of body 22 and is oriented to rotate the body 22 about an axis orthogonal to the laser axis in order to adjust the angles of incidence and exit of the coherent light with respect to the normal to the major surfaces of body 22 and, consequently, the optical path length within the device 21. Illustratively, these angles of incidence and exit range between 0 degree and about 6 degrees.

The body 22 of semiconductive material is illustratively n-type indium arsenide having a concentration of mobile charge carriers in the nonparabolic conduction band of about $1 \times 10^{17}$ charge carriers per cubic centimeter. The dimensions of the body 22 are illustratively one centimeter between coatings 23 and 24, one centimeter parallel to coatings 23 and 24 and orthogonal to axle 25 and one centimeter parallel to axle 25.

For the purposes of the present invention, the concentration of mobile charge carriers in the plasma device could vary from $5 \times 10^{15}$ to $5 \times 10^{20}$ charge carriers per cubic centimeter, although a range from $5 \times 10^{16}$ to $5 \times 10^{18}$ is preferred. Other semiconductive materials which have nonparabolic conduction bands and which appear particularly appropriate for the present invention are indium antimonide and lead telluride. The material can be p-type if the device includes means for reducing band degeneracy. For example, such means would comprise means for applying uniaxial stress to the p-type material.

Optional details of carbon dioxide lasers such as that illustrated in FIG. 1 may be found in my copending patent application Ser. No. 814,510 filed Mar. 28, 1969 which is a continuation-in-part of abandoned application, Ser. No. 495,844, filed Oct. 14, 1965, and assigned to the assignee hereof. Many of those details may be applicable to other molecular lasers and could therefore be used in a wide variety of embodiments of the present invention.

In the operation of the embodiment of FIG. 1, several lasing transitions of the laser are amplitude and phase-locked by means of a nonlinear interaction in the plasma device 21. The transitions are transitions between rotational energy levels that are associated with different vibrational energy levels of the carbon dioxide molecule. Typically, most of them would be of the type designated P-branch transitions, inasmuch as these are the higher gain transitions. The gain distribution of several such transitions is illustrated by curve 56 of FIG. 3. Each blip in the gain distribution represents a different P-branch transition, each of which is designated by a P ($n$) number designation in the manner familiar to workers in the molecular spectroscopy and molecular laser arts. This gain distribution represents the relative gains theoretically available to the various transitions in the absence of competition effects and environmental disturbances. It will be seen that the P (20) transition is the strongest and that the rest fall into a nearly Gaussian distribution. They all are spaced in frequency by approximately 56 gigahertz, that is, 56 kilomegacycles per second.

In the absence of amplitude and phase-locking, the distribution of amplitudes of the lasing transitions will in general not conform to the gain distribution but instead will be more like the amplitude distribution shown in curve 57 of FIG. 3. This distortion of the distribution results both from weak competition effects and environmental disturbances.

Amplitude and phase-locking occurs through the coupling of the different transitions through a third-order nonlinear interaction between the coherent light of the transitions and the mobile charge carriers of the body 22. These charge carriers can be termed a plasma; and the third-order nonlinear interaction can be termed a parametric interaction because it leaves no significant amount of excitation in the charge carriers. Viewed in this way, a large number of parametric interactions occur simultaneously. If the frequency separations of the various transitions deviate from equality, the strengths of some of the nonlinear interactions are correspondingly reduced. Nevertheless, some of the weaker interactions can be strengthened by rotating the device 21 upon the axle 25 to provide a greater path length for the interactions. Nevertheless, it is desired not to introduce excessive attenuation into the laser resonator.

As in other parametric interactions, a frequency relationship representing conservation of energy must be satisfied. Thus, two quanta of light from one transition must provide one quanta of another transition and one quanta of a third frequency. Thus, $2\omega_1 = \omega_2 + \omega_3$ or $$\omega_3 = 2\omega_1 - \omega_2$$

as set forth in my patent, with others, No. 3,371,220 cited below. Since the transitions are nearly equally spaced in frequency, the third frequency will be the frequency of a third transition. A relationship of propagation vectors called phase matching must also be satisfied. Because of the relatively low frequency difference of the transitions, this condition is satisfied nearly automatically. In other words, coherence lengths are very much longer than the path length in device 21.

The dependence of the third-order nonlinear coefficient, or susceptibility, upon the nonparabolicity of the conduction band in the body 22 is explained in greater detail in my copending patent application with others, Ser. No. 589,452, filed Oct. 25, 1966, and assigned to the assignee hereof, which application is now U.S. Patent No. 3,371,-220, granted Feb. 27, 1965.

Unlike the coupling effect of competition between the various lasing transitions, the parametric coupling of the transitions through the third-order nonlinear interaction is a stable, reversible sort of energy coupling and provides the desired amplitude and phase-locking of the transitions. The resulting amplitude distribution of the various transitions is shown in curve 58 of FIG. 3. Ideally, this distribution would be nearly identical to the gain distribution of curve 56. Even if unequal frequency spacings produce some differences between curves 56 and 58, the differences are of relatively little importance, at least for purposes of communication. So long as the coupling is strong enough to achieve amplitude and phase-locking, the usefulness of the output for communication is greatly improved, as compared to an output represented by curve 57. For example, if the apparatus 26 is a parametric frequency converter, its efficiency is greatly increased by the phase-locked radiations it receives.

It is especially noteworthy that the amplitude and phase-locking is achieved without any externally applied signal. Thus, the apparatus is more simple and efficient and free of some transients found in prior art schemes for amplitude and phase-locking.

Figure 2:
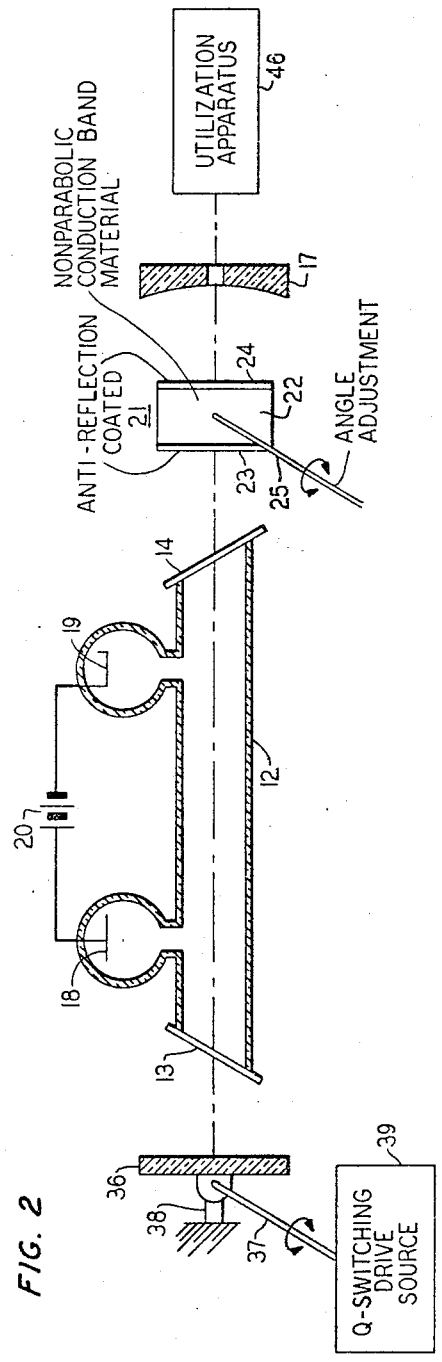
FIG. 2 is a partially pictorial and partially block diagrammatic illustration of a second embodiment of the invention.

The energy coupling between the optical radiations, or light, of the various transitions builds up so quickly that it can be employed to produce amplitude and phase-locking of the transitions in a Q-switched molecular laser, as shown by the illustrative embodiment of FIG. 2.

In FIG. 2, components numbered the same as components in FIG. 1 are substantially identical thereto. Reflector 16 of FIG. 1 is replaced in the embodiment of FIG. 2 by means for Q-switching the laser. The Q-switching means comprises the reflector 36, means 38 for rotatably mounting the reflector 36 and means for rotating the reflector 36 about an axis orthogonal to the laser axis. The rotating means includes the axle 37 and the Q-switching drive source 39, which drives the combination through axle 37.

The operation of the embodiment of FIG. 2 is substantially identical to the operation of the embodiment of FIG. 1, regardless of the speed of Q-switching. It is understood, of course, for extremely fast Q-switching, competition effects are reduce and the effects that are eliminated by amplitude and phase-locking tend to be primarily randomly fluctuating effects such as fluctuations in the discharge and fluctuations to the characteristics of the optical resonator.

Various modifications of the present invention should be apparent to the worker skilled in the art. For example, the present invention can be practiced with any laser having at least two different lasing transitions possessed of sufficient intensity.

What is claimed is:
1. Apparatus comprising
   a laser comprising an optical resonator and an active medium disposed within said optical resonator, said laser including means for extracting coherent wave oscillations from said resonator; and
   means driven only by said oscillations and disposed within said resonator for parametrically mixing different oscillations of said laser to provide energy transfer between said oscillations above a threshold level for producing longitudinal mode locking of said oscillations,
said optically driven means causing parametric interactions in which two quanta of light of one oscillation provide one quanta of another oscillation and one quanta of a third oscillation of said active medium so that amplitude and phase-locking of said oscillations occurs.

2. Apparatus according to claim 1, in which the means for parametrically mixing the different oscillations comprises a plasma device disposed in the resonator, the plasma device including a body of material having a substantially nonparabolic conduction band and having a substantial plasma of mobile charge carriers in said conduction band.

3. Apparatus according to claim 2, in which the active medium comprises a molecular active medium capable of a plurality of lasing transitions between rotational energy levels associated with differing vibrational energy levels and the mixing means includes a body of a semiconductive material having a substantially nonparabolic conduction band and being characterized by energy transfer by a third-order nonlinear interaction.

4. Apparatus according to claim 2, in which the active medium of the laser includes carbon dioxide gas providing several lasing transitions in the infrared and the mixing means comprises a crystal of indium arsenide having a concentration of mobile charge carriers between $5 \times 10^{15}$ and $5 \times 10^{20}$ charge carriers per cubic centimeter.

5. Apparatus according to claim 2, in which the active medium of the laser includes carbon dioxide gas, the laser being adapted to operate upon several lasing transitions near a wavelength of 10.6 microns and the mixing means comprises a crystal of indium arsenide having a concentration of mobile charge carriers between $5 \times 10^{16}$ and $5 \times 10^{18}$ per cubic centimeter.

References Cited

UNITED STATES PATENTS 3,371,220  2/1968  Fleury et al. _____ 307—88.3
3,412,251  11/1968  Hargrove _____ 250—199

OTHER REFERENCES

Patel: "Continuous-Wave Laser Action on Vibrational Rotational Transitions of $CO_2$," Physical Review, vol. 136, pp. A1187–93, Nov. 30, 1964.

JEWELL H. PEDERSEN, Primary Examiner

E. BAUER, Assistant Examiner

U.S. Cl. X.R.

307—88.3